(12) United States Patent
Wang et al.

(10) Patent No.: US 11,997,372 B2
(45) Date of Patent: May 28, 2024

(54) OPTICAL COMPONENT DRIVING MECHANISM WITH DRIVING ASSEMBLY

(71) Applicant: TDK TAIWAN CORP., Taoyuan (TW)

(72) Inventors: Chao-Hsi Wang, Taoyuan (TW); Yueh-Lin Lee, Taoyuan (TW); Ko-Lun Chao, Taoyuan (TW); Chao-Chang Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 9 days.

(21) Appl. No.: 17/735,523

(22) Filed: May 3, 2022

(65) Prior Publication Data

US 2022/0353390 A1    Nov. 3, 2022

Related U.S. Application Data

(60) Provisional application No. 63/183,395, filed on May 3, 2021.

(51) Int. Cl.
| | |
|---|---|
| *H04N 23/54* | (2023.01) |
| *G02B 7/09* | (2021.01) |
| *H04N 23/51* | (2023.01) |
| *H04N 23/55* | (2023.01) |

(52) U.S. Cl.
CPC ............... *H04N 23/54* (2023.01); *G02B 7/09* (2013.01); *H04N 23/51* (2023.01); *H04N 23/55* (2023.01)

(58) Field of Classification Search
CPC ........ H04N 23/54; H04N 23/51; H04N 23/55; G02B 7/09; G02B 7/08; G02B 7/00; G02B 7/04; G03B 2205/0069; G03B 9/08; G03B 30/00
See application file for complete search history.

(56) References Cited

U.S. PATENT DOCUMENTS

| | | | | |
|---|---|---|---|---|
| 2008/0284255 | A1* | 11/2008 | Liu | G02B 7/102 |
| | | | | 310/12.19 |
| 2009/0128880 | A1* | 5/2009 | Okita | G02B 26/02 |
| | | | | 359/233 |
| 2009/0245780 | A1* | 10/2009 | Chiang | G03B 9/14 |
| | | | | 396/469 |
| 2012/0154912 | A1* | 6/2012 | Shihoh | G02B 27/64 |
| | | | | 359/554 |
| 2013/0077950 | A1* | 3/2013 | Liu | G03B 9/18 |
| | | | | 396/497 |
| 2020/0028998 | A1* | 1/2020 | Jun | H04N 23/51 |

* cited by examiner

*Primary Examiner* — Padma Haliyur
(74) *Attorney, Agent, or Firm* — MUNCY, GEISSLER, OLDS & LOWE, PC

(57) ABSTRACT

An optical component driving mechanism is provided. The optical component driving mechanism includes a first movable portion, a fixed portion, and a first driving assembly. The fixed portion includes a first opening. The first movable portion is movable relative to the fixed portion. The first driving assembly is configured to drive the first movable portion to move relative to the fixed portion.

16 Claims, 8 Drawing Sheets

OPTICAL COMPONENT DRIVING MECHANISM WITH DRIVING ASSEMBLY

CROSS REFERENCE TO RELATED APPLICATIONS

This application claims the benefit of U.S. Provisional Application No. 63/183,395 filed 3 May 2021, the entirety of which is incorporated by reference herein.

BACKGROUND OF THE INVENTION

Field of the Invention

The present disclosure relates to an optical component driving mechanism, and more particularly to an optical component driving mechanism with a sensing assembly.

Description of the Related Art

As technology has developed, it has become more common to include image-capturing and video-recording functions into many types of modern electronic devices, such as notebook computers, smartphones, and digital cameras. These electronic devices are used more and more often, and new models have been developed that are convenient, thin, and lightweight, offering more choices for consumers.

Electronic devices that have image-capturing or video-recording functions normally include a driving mechanism to drive an optical component to move. Light may pass through the optical component and may form an image on an optical sensor. However, the trend in modern mobile devices is to have a higher durability and a greater privacy. As a result, the present disclosure provides a driving mechanism that is different from the prior ones, to increase its stability and also improve information security.

BRIEF SUMMARY OF THE INVENTION

An optical component driving mechanism is provided. The optical component driving mechanism includes a first movable portion, a fixed portion, and a first driving assembly. The fixed portion includes a first opening. The first movable portion is movable relative to the fixed portion. The first driving assembly is configured to drive the first movable portion to move relative to the fixed portion.

In some embodiments of the present disclosure, the first opening corresponds to a first optical module. The first movable portion and the first opening at least partially overlap when the first movable portion is in the first position.

In some embodiments of the present disclosure, the optical component driving mechanism further includes a second movable portion and a second driving assembly. The second driving assembly is configured to drive the second movable portion to move relative to the fixed portion. The first driving assembly includes a first driving portion disposed in the fixed portion. The second driving assembly includes a second driving portion disposed in the fixed portion.

In some embodiments of the present disclosure, the first driving portion and the second driving portion are jointly driven.

In some embodiments of the present disclosure, the first driving portion and the second driving portion are individually driven.

In some embodiments of the present disclosure, the first driving portion includes a first segment and a second segment. The second driving portion includes a third segment and a fourth segment. The first segment, the second segment, the third segment, and the fourth segment do not overlap when viewed along a direction of an optical axis.

In some embodiments of the present disclosure, the first segment, the second segment, the third segment, and the fourth segment surround the first opening when viewed along the direction of the optical axis.

In some embodiments of the present disclosure, the fixed portion further includes a second opening and a third opening. The first segment, the second segment, the third segment, and the fourth segment surround the first opening, the second opening, and the third opening when viewed along the direction of the optical axis.

In some embodiments of the present disclosure, when the first movable portion is in the first position, the first movable portion overlaps a part of the first opening and the entirety of the second opening in the direction of the optical axis.

In some embodiments of the present disclosure, when the second movable portion is in the first position, the second movable portion overlaps a part of the first opening and the entirety of the third opening in the direction of the optical axis.

In some embodiments of the present disclosure, the optical component driving mechanism further includes a second driving assembly. The first driving assembly includes a first magnetic component. The second driving assembly includes a second magnetic component. The first magnetic component and the second magnetic component are disposed in the fixed portion.

In some embodiments of the present disclosure, the first magnetic component and the second magnetic component are each disposed in the corners of the fixed portion that are not adjacent to each other.

In some embodiments of the present disclosure, the optical component driving mechanism further includes a sensing assembly and a second movable portion. The sensing assembly corresponds to the first movable portion and the second movable portion.

In some embodiments of the present disclosure, the sensing assembly includes a light-emitting component and a light-receiving component. The light-emitting component is closer to the light incident end of the optical axis than the light-receiving component.

In some embodiments of the present disclosure, when the first movable portion and the second movable portion are in the first position, the sensing assembly determines the first movable portion and the second movable portion are in a closed state.

In some embodiments of the present disclosure, when the first movable portion is in the first position and the second movable portion is in the second position, the sensing assembly determines the first movable portion and the second movable portion are in an open state.

In some embodiments of the present disclosure, when the first movable portion is in the second position and the second movable portion is in the first position, the sensing assembly determines the first movable portion and the second movable portion are in an open state.

In some embodiments of the present disclosure, the fixed portion further includes a stopper portion limiting the range of motion of the first movable portion.

In some embodiments of the present disclosure, the optical component driving mechanism further includes a second movable portion. The first movable portion and the second movable portion partially overlaps in the direction of the optical axis, when the first movable portion and the second movable portion are in a first position.

In some embodiments of the present disclosure, the optical component driving mechanism further includes a spacer plate disposed between the first movable portion and the second movable portion in the direction of the optical axis.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
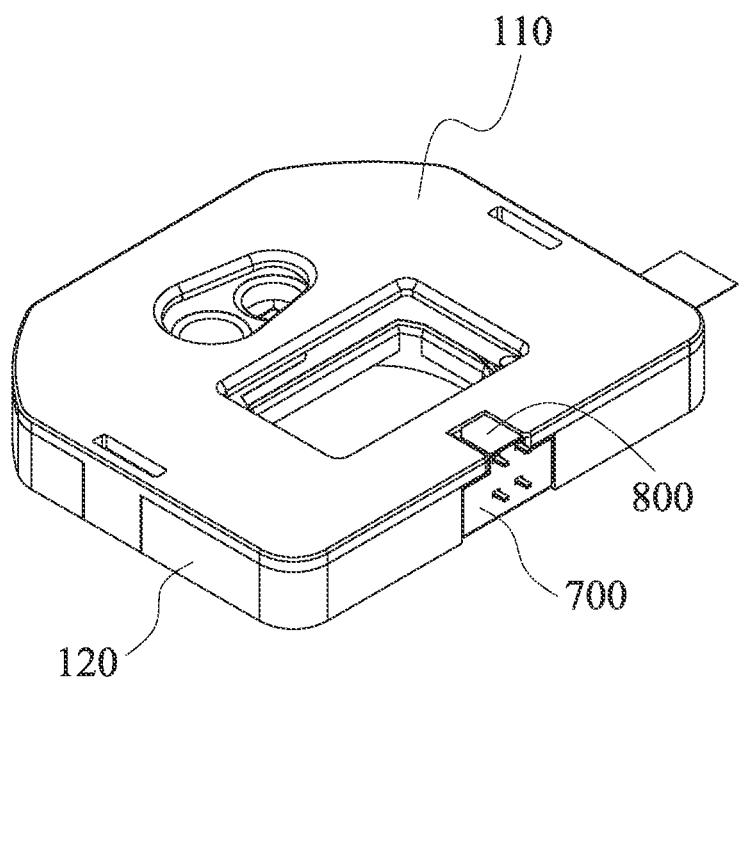
FIG. 1A is a perspective view of an optical component driving mechanism, according to certain aspects of the present disclosure.

The present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim component does not by itself connote any priority, precedence, or order of one claim component over another or the temporal order in which acts of a method are performed, but are used merely as labels to distinguish one claim component having a certain name from another component having the same name (but for use of the ordinal term) to distinguish the claim components.

In addition, in some embodiments of the present disclosure, terms concerning attachments, coupling and the like, such as "connected" and "interconnected", refer to a relationship wherein structures are secured or attached to one another either directly or indirectly through intervening structures, ac well as both movable or rigid attachments or relationships, unless expressly described otherwise.

Figure 1B:
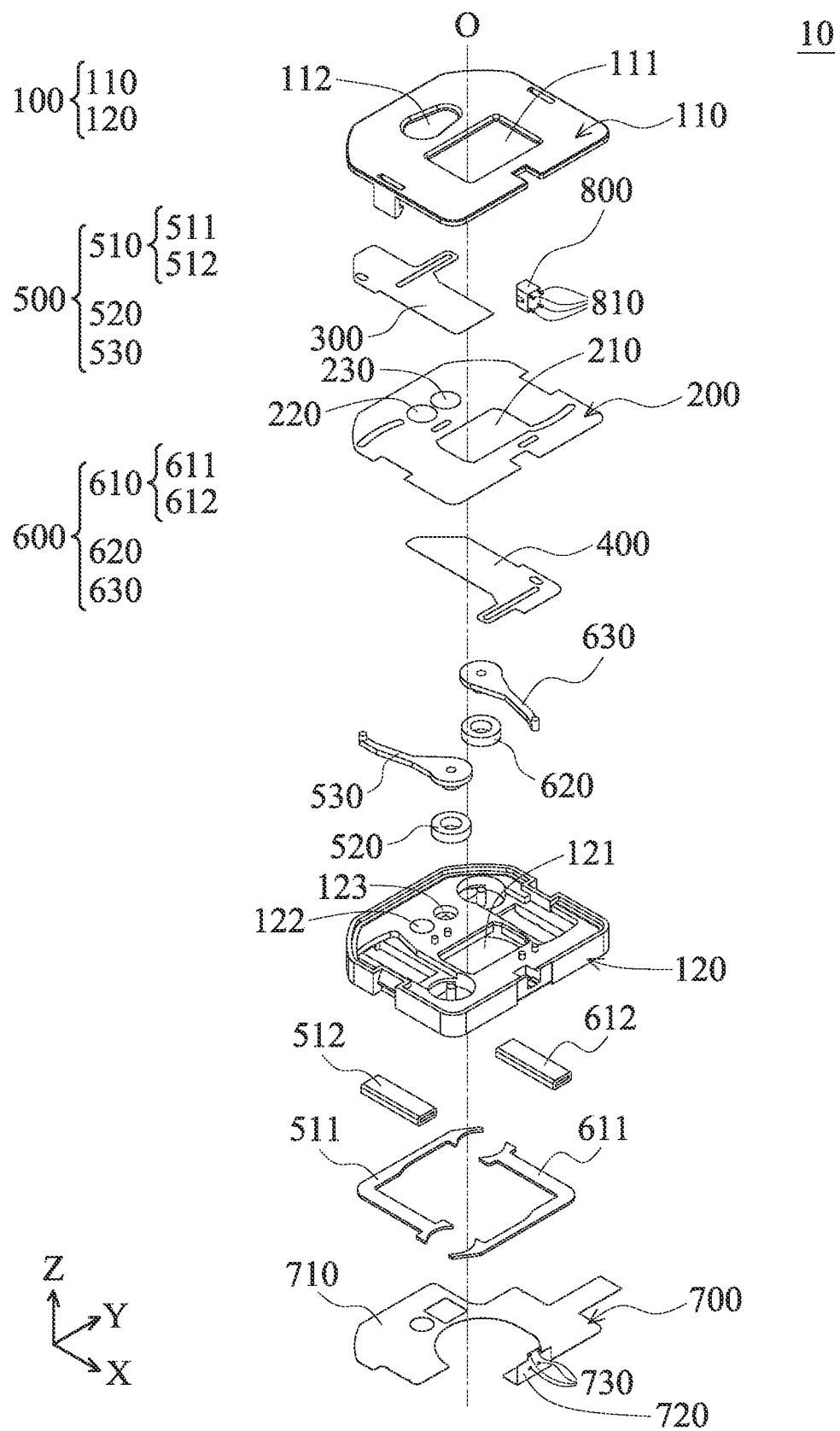
FIG. 1B is an exploded view of the optical component driving mechanism, according to certain aspects of the present disclosure.

FIG. 1A is a perspective view of an optical component driving mechanism 10, according to certain aspects of the present disclosure. FIG. 1B is an exploded view of the optical component driving mechanism 10, according to certain aspects of the present disclosure.

Please refer to FIGS. 1A to 1B together, the optical component driving mechanism 10 includes a fixed portion 100, a spacer plate 200, a first movable portion 300, a second movable portion 400, and a first driving assembly 500, a second driving assembly 600, a circuit assembly 700, and a sensing assembly 800.

In some embodiments, the fixed portion 100 includes a casing 110 and a base 120. The casing 110 includes two openings 111, 112. The base 120 includes a first opening 121, a second opening 122, and a third opening 123. The size of the first opening 121 is larger than that of the second opening 122 and the third opening 123. The spacer plate 200 includes three openings 210, 220, 230.

The opening 111 of the casing 110, the first opening 121 of the base 120, and the opening 210 of the spacer plate 200 correspond to a first optical module (not shown). The first optical module has an optical axis O passing through the opening 111 of the casing 110, the first opening 121 of the base 120, and the opening 210 of the spacer plate 200. The optical axis O is incident on the optical component driving mechanism 10 through the opening 111 of the casing 110. Therefore, the end of the optical axis O close to the casing 110 is the light incident end. The optical axis O is generally parallel to the Z-direction.

The opening 112 of the casing 110, the second opening 122 of the base 120, and the opening 220 of the spacer plate 200 correspond to a second optical module (not shown). The opening 112 of the casing 110, the third opening 123 of the base 120, and the opening 230 of the spacer plate 200 correspond to a third optical module (not shown).

The spacer plate 200 is disposed between the first movable portion 300 and the second movable portion 400. The first movable portion 300 and the second movable portion 400 are movable between a first position and a second position. The details thereof are described in detail with respect to FIGS. 4A to 4C.

The first movable portion 300 and the second movable portion 400 may be applied as shutter blades, filters, dimming filters, polarizers and other optical components. It should be understood that, in different embodiments, the first movable portion 300 and the second movable portion 400 may also be used to connect to the optical component, so as to move the optical component relative to the fixed portion 100.

In some embodiments, the first driving assembly 500 is configured to drive the first movable portion 300 to move relative to the fixed portion 100. The second driving assembly 600 is configured to drive the second movable portion 400 to move relative to the fixed portion 100. The first driving assembly 500 includes a first driving portion 510, a first magnetic component 520, and a first driving component 530. The second driving assembly 600 includes a second driving portion 610, a second magnetic component 620, and a second driving component 630.

The first driving portion 510 includes a first magnetically permeable component 511 and a first coil 512. The first driving portion 510 corresponds to the first magnetic component 520. The second driving portion 610 includes a second magnetically permeable component 611 and a second coil 612. The second driving portion 610 corresponds to the second magnetic component 620.

The first driving assembly 500 and the second driving assembly 600 are electrically connected to the circuit assembly 700. The circuit assembly 700 is connected to the base 120. The circuit assembly 700 includes a first portion 710, a second portion 720, and a set of holes 730. The first portion 710 is generally parallel to the casing 110. The second portion 720 is perpendicular to the first portion 710. The holes 730 are located on the second portion 720.

Figure 3A:
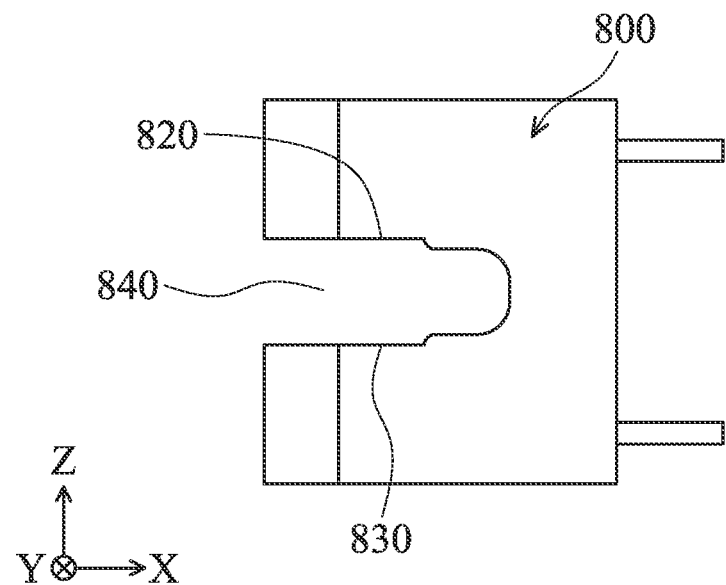
FIG. 3A shows a side view of a sensing assembly.

The sensing assembly 800 is electrically connected to the circuit assembly 700. The sensing assembly 800 includes a set of connecting portions 810, a light-emitting component 820 (FIG. 3A), a light-receiving component 830 (FIG. 3A), and an accommodating space 840 (FIG. 3A). The sensing assembly 800 is fixed to the circuit assembly 700 by the connection between the connecting portions 810 and the holes 730.

Figure 2A:
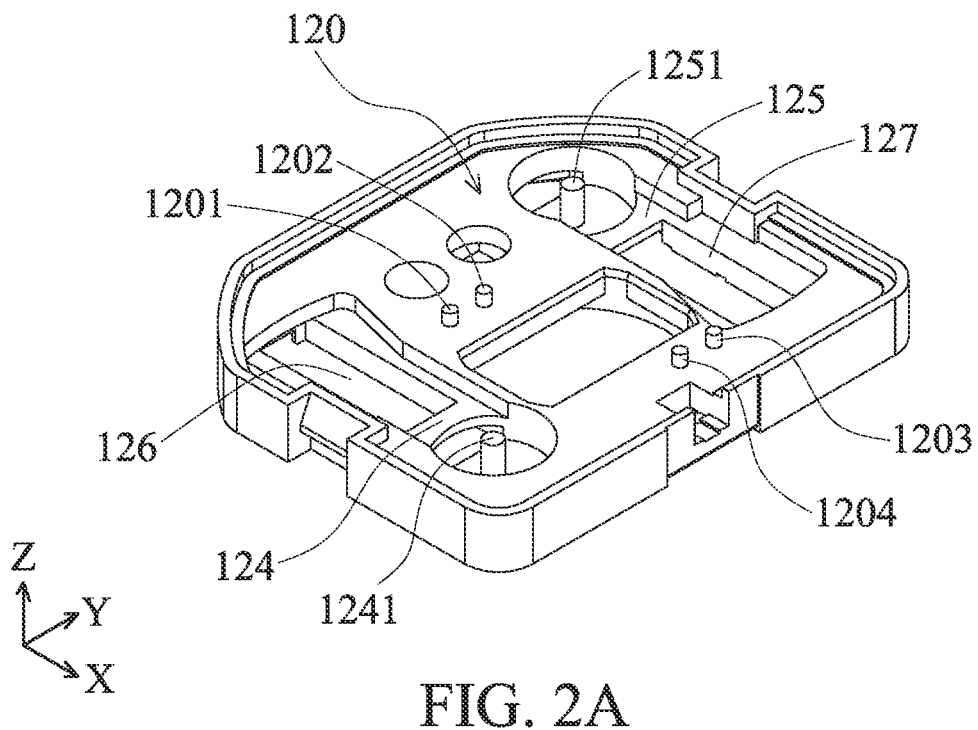
FIG. 2A is a perspective view of a base, according to certain aspects of the present disclosure.
Figure 2B:
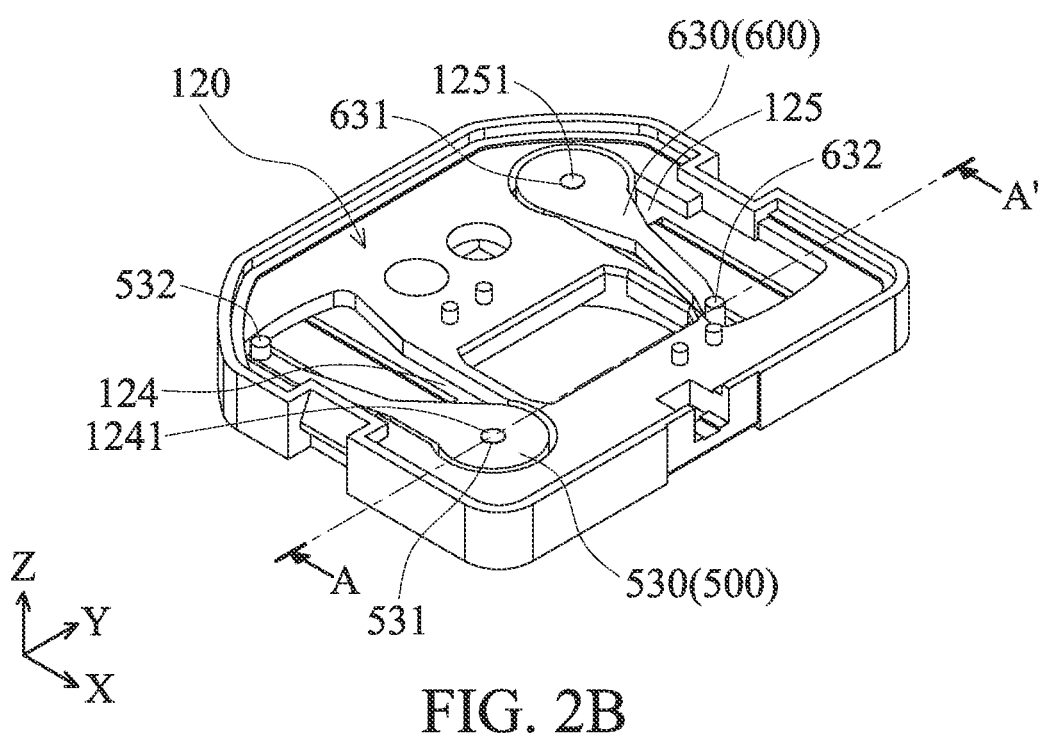
FIG. 2B is a perspective view of the base, a first driving assembly, a second driving assembly, according to certain aspects of the present disclosure.
Figure 2C:
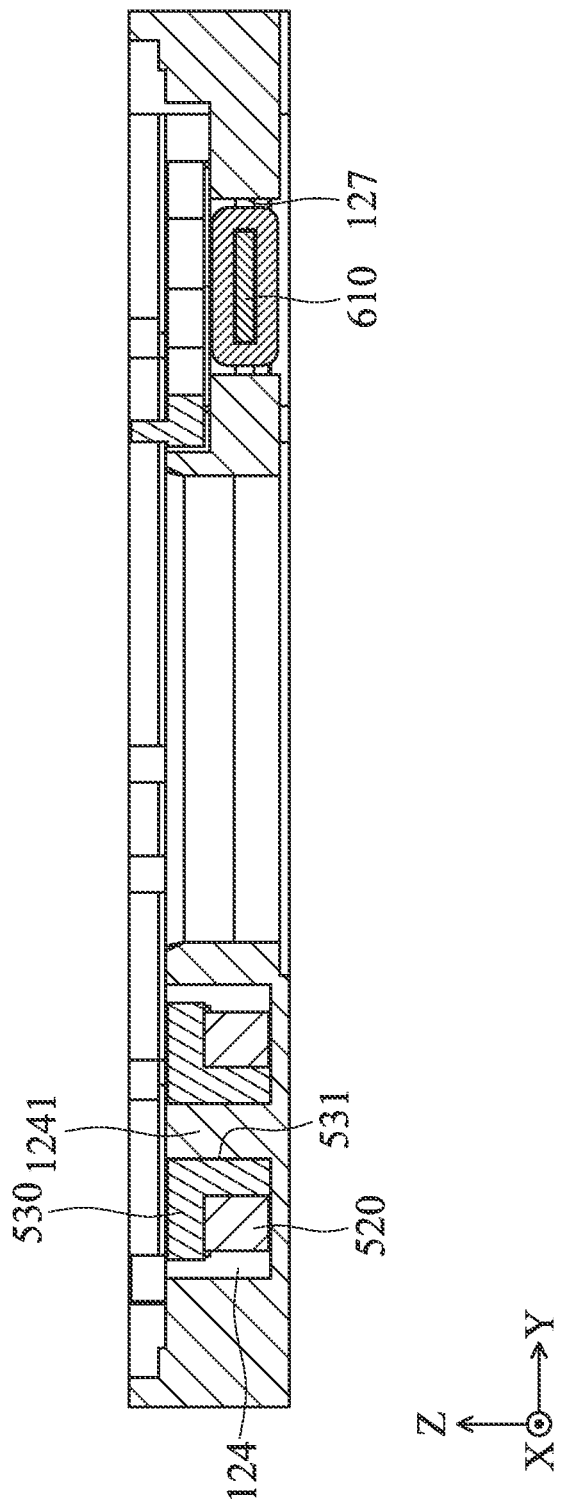
FIG. 2C is a cross-sectional view taken along the line A-A' of FIG. 2B.

FIG. 2A is a perspective view of the base 120, according to certain aspects of the present disclosure. FIG. 2B is a perspective view of the base 120, the first driving assembly 500, and the second driving assembly 600, according to certain aspects of the present disclosure. FIG. 2C is a cross-sectional view taken along the line A-A' of FIG. 2B.

It can be seen from FIG. 2A that the base 120 further includes two first receiving portions 124 and 125, protruding posts 1241 and 1251 two second accommodating portions 126 and 127 and four stopper portions 1201 and 1202, 1203, 1204.

As shown in FIG. 2B, the first driving component 530 includes a hole 531 and a protruding portion 532. The first driving component 530 is disposed in the first receiving portion 124. The second driving component 630 includes a hole 631 and a protruding portion 632. The second driving component 630 is disposed in the first receiving portion 125.

As shown in FIG. 2C, the first magnetic component 520 and the first driving component 530 are disposed in the first receiving portion 124 together. Although not shown, the second magnetic component 620 and the second driving component 630 are disposed in the second receiving portion 125 in a similar manner. The protruding post 1241 passes through the first magnetic component 520 and the hole 531 of the first driving component 530. Although not shown, the protruding post 1251 passes through the second magnetic component 620 and the hole 631 of the second driving component 630 in a similar manner.

It can also be seen from FIG. 2C that the second driving portion 610 is disposed in the second accommodating portion 127. Although not shown, the first driving portion 510 is disposed in the second receiving portion 126 in a similar manner.

The first magnetic component 520 is connected to the first driving component 530. When the first driving portion 510 (FIG. 1) is driven, the first magnetic component 520 will drive the first driving component 530 to move in a first dimension. The motion in first dimension s rotation about the protruding post 1241.

Although not shown, the second magnetic component 620 is connected to the second driving component 630 in a similar manner. When the second driving portion 610 is driven, the second magnetic component 620 will drive the second driving component 630 to move in a second dimension. The motion in second dimension is rotation about the protruding post 1251 (FIG. 2B).

Figure 3B:
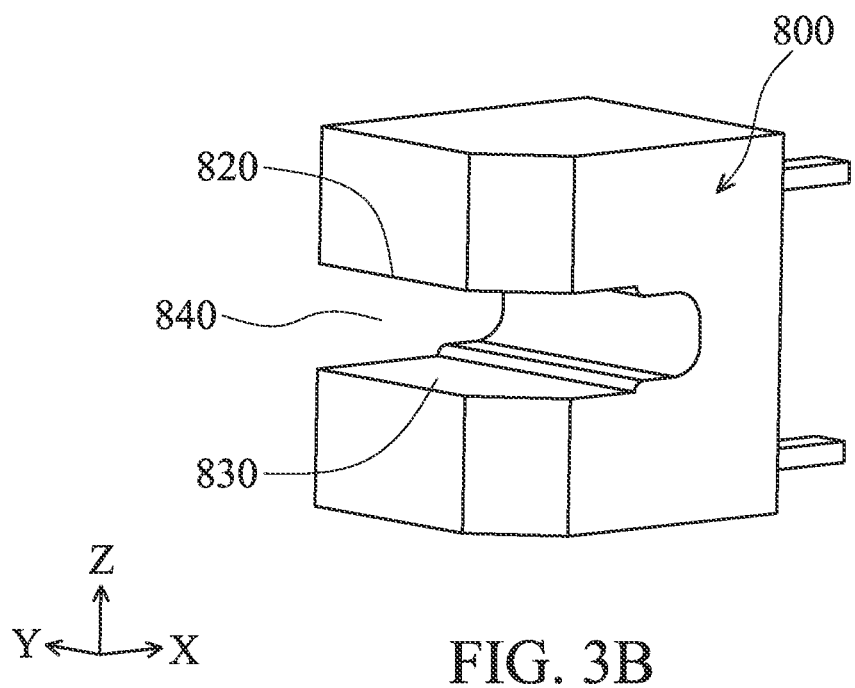
FIG. 3B shows a perspective view of the sensing assembly.

FIG. 3A shows a side view of the sensing assembly 800. FIG. 3B shows a perspective view of the sensing assembly 800. The light-emitting component 820 is closer to the light incident end of the optical axis O than the light-receiving component 830, that is, the light-emitting component 820 is closer to the casing 110 (FIG. 1B), and the light-receiving component 830 is closer to the circuit assembly 700 (FIG. 1B).

The accommodating space 840 is the space between the light-emitting component 820 and the light-receiving component 830. The sensing assembly 800 may determine the positions of the first movable portion 300 and the second movable portion 400 by the condition of the light-receiving component 830 receiving the signal from the light-emitting component 820. The details thereof are described in detail with respect to FIGS. 4B to 4C.

Figure 4A:
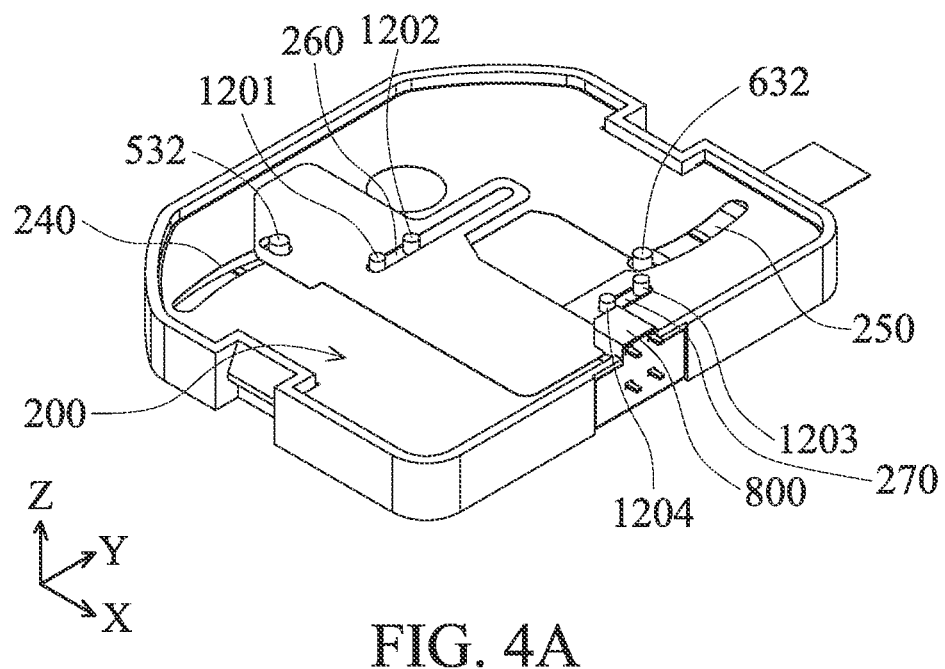
FIG. 4A is a perspective view of the optical component driving mechanism with a first movable portion and a second movable portion in a first position, and a casing is not shown for the purpose of illustration.
Figure 4B:
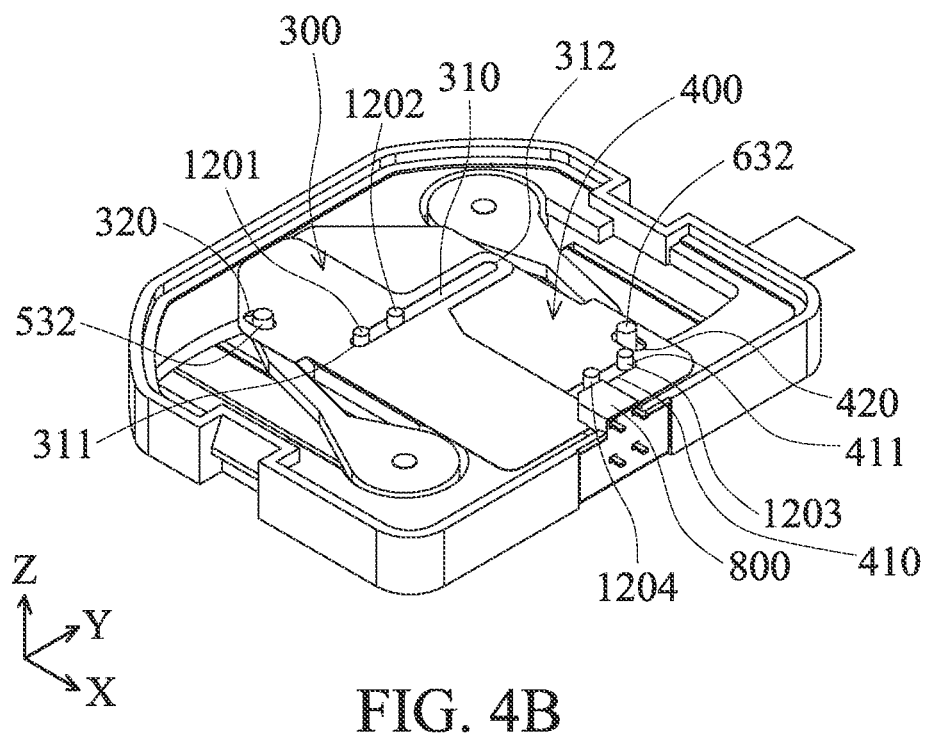
FIG. 4B is a perspective view of the optical component driving mechanism with the first movable portion and the second movable portion in the first position, and the casing and a spacer plate are not shown for the purpose of illustration.
Figure 4C:
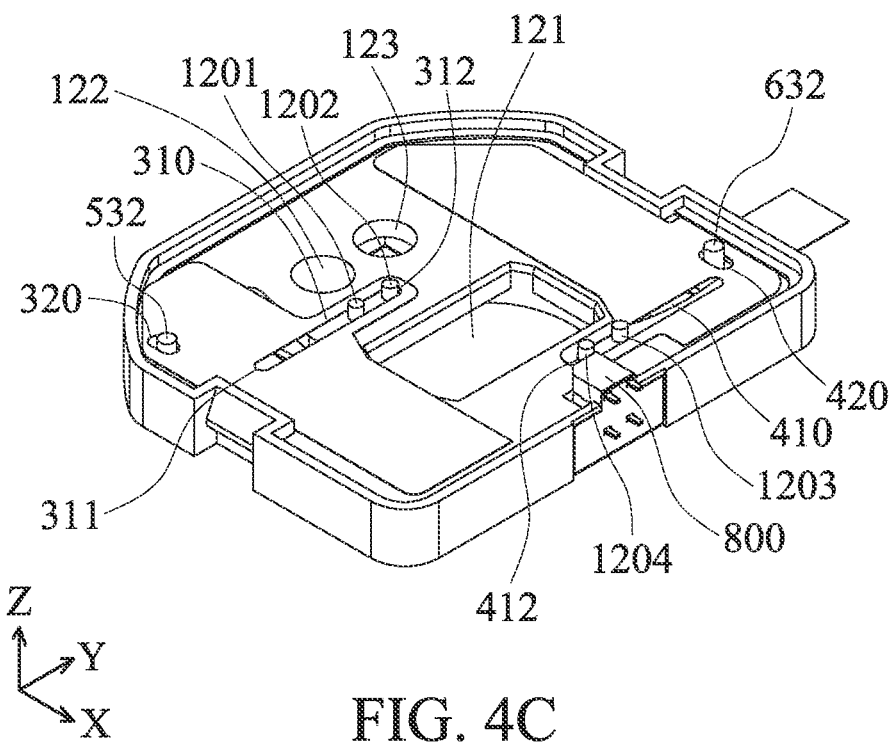
FIG. 4C is a perspective view of the optical component driving mechanism with the first movable portion and the second movable portion in the second position, and the casing and the spacer plate are not shown for the purpose of illustration.

FIG. 4A is a perspective view of the optical component driving mechanism 10 with the first movable portion 300 and the second movable portion 400 in the first position, and the casing 110 is not shown for the purpose of illustration. FIG. 4B is a perspective view of the optical component driving mechanism 10 with the first movable portion 300 and the second movable portion 400 in the first position, and the casing 110 and the spacer plate 200 are not shown for the purpose of illustration. FIG. 4C is a perspective view of the optical component driving mechanism 10 with the first movable portion 300 and the second movable portion 400 in the second position, and the casing 110 and the spacer plate 200 are not shown for the purpose of illustration.

As shown in FIG. 4A, the spacer plate 200 further includes guiding portions 240 and 250 and positioning holes 260 and 270. The protruding portion 532 passes through the guiding portion 240 and is movable within the guiding portion 240. The protruding portion 632 passes through the guiding portion 250 and is movable within the guiding portion 250. The stopper portions 1201 and 1202 pass through the positioning holes 260. The stopper portions 1203 and 1204 pass through the positioning holes 270.

As shown in FIG. 4B and FIG. 4C, the first movable portion 300 includes a channel 310 and a hole 320. The channel 310 includes a first end 311 and a second end 312. The channel 310 corresponds to the stopper portions 1201 and 1202. The second movable portion 400 includes a channel 410 and a hole 420. The channel 410 includes a first end 411 and a second end 412. The channel 410 corresponds to the stopper portions 1203 and 1204 of the base 120.

The protruding portion 532 passes through the hole 320 to drive the first movable portion 300 to move between the first position and the second position. The protruding portion 632 passes through the hole 420 to drive the second movable portion 400 to move between the first position and the second position.

As shown in FIG. 4B, when the first movable portion 300 and the second movable portion 400 move to the first position, the first end 311 contacts the stopper portion 1201, and the first end 411 contacts the stopper portion 1203, thereby limiting the range of motion of the first movable portion 300 and the second movable portion 400.

As shown in FIG. 4C, when the first movable portion 300 and the second movable portion 400 move to the second position, the second end 312 contacts e stopper portion 1202, and the second end 412 contacts the stopper portion 1204 thereby limiting the range of motion of the first movable portion 300 and the second movable portion 400.

When the first movable portion 300 and the second movable portion 400 are in the first position, the first movable portion 300 overlaps a part of the first opening 121 and the entirety of the second opening 122 in the Z-direction. Also, the second movable portion 400 overlaps a part of the first opening 121 and the entirety of the third opening 123 in the Z-direction, which prevents light from passing through the optical component driving mechanism 10 into the first optical module (not shown), the second optical module (not shown), and the third optical module (not shown). In addition, when the first movable portion 300 and the second movable portion 400 are in the first position, the first movable portion 300 and the second movable portion 400 partially overlap in the Z-direction.

When the first movable portion 300 and the second movable portion 400 are in the first position, since a part of the first movable portion 300 and the second movable portion 400 are located in the accommodating space 840 of the sensing assembly 800 (FIG. 3A), and block the light-receiving component 830 (FIG. 3A) from receiving the signal (e.g., infrared rays) emitted by the light-emitting component 820 (FIG. 3A). Thus, the sensing assembly 800 determines the first movable portion 300 and the second movable portion 400 is in a closed state.

When the first movable portion 300 and the second movable portion 400 are in the second position, since the first movable portion 300 and the second movable portion 400 are not located in the accommodating space 840 of the sensing assembly 800, therefore the light-receiving component 830 is not blocked from receiving the signal (e.g., infrared rays) emitted by the light-emitting component 820. Thus, the sensing assembly 800 determines that the first movable portion 300 and the second movable portion 400 are in an open state.

Figure 5:
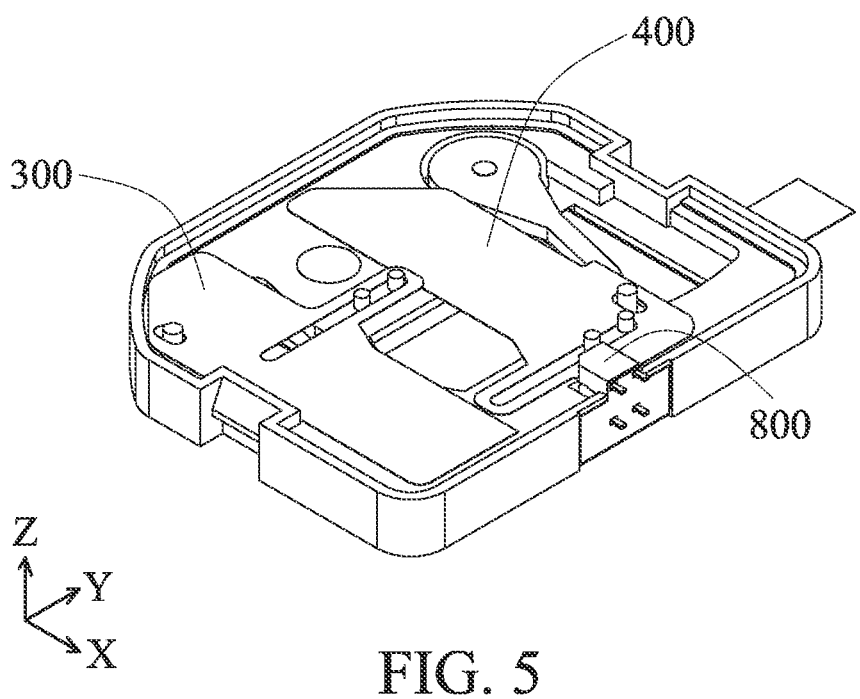
FIG. 5 shows a perspective view of the optical component driving mechanism with the first movable portion in the second position and the second movable portion in the first position, and the casing and the spacer plate are not shown for the purpose of illustration.

FIG. 5 shows a perspective view of the optical component driving mechanism 10 with the first movable portion 300 in the second position and the second movable portion 400 in the first position, the casing 110 and the spacer plate 200 are not shown for the purpose of illustrations. It should be noted that when the first movable portion 300 is in the second position and the second movable portion 400 is in the first position, the sensing assembly 800 will determine that the first movable portion 300 and the second movable portion 400 are in an open state.

Similarly, when the first movable portion 300 is in the first position and the second movable portion 400 is in the second position, the sensing assembly 800 will determine that the first movable portion 300 and the second movable portion 400 are in the open state.

Figure 6A:
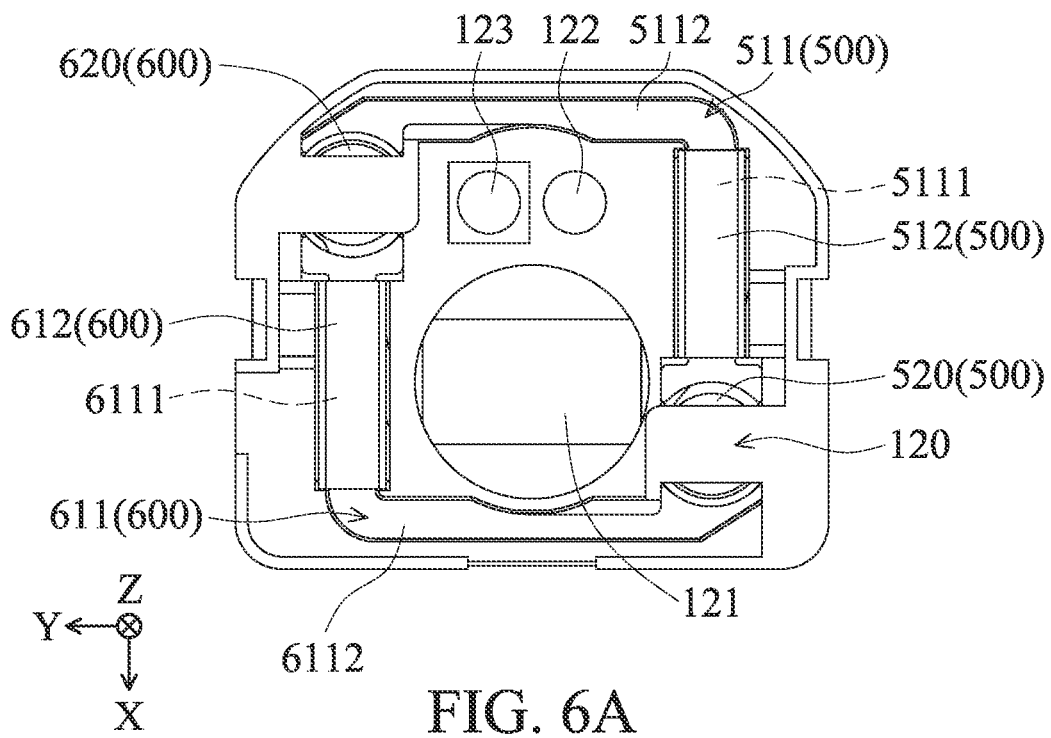
FIG. 6A is a bottom view of the base, the first driving assembly, and the second driving assembly, according to certain aspects of the present disclosure.
Figure 6B:
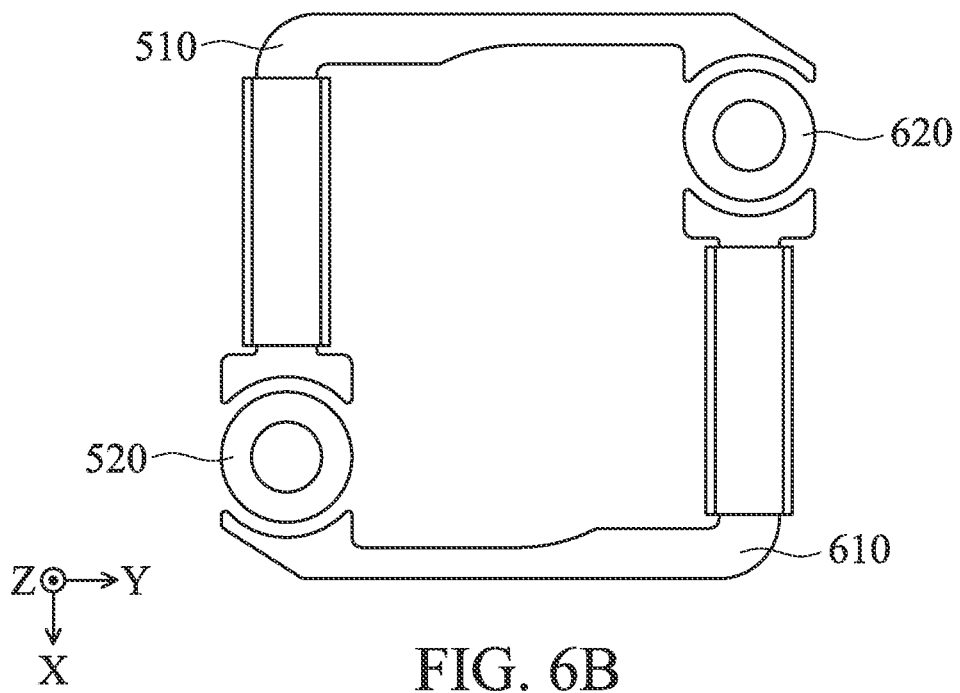
FIG. 6B is a top view of the first driving assembly and the second driving assembly.

FIG. 6A is a bottom view of the base 120, the first driving assembly 500, and the second driving assembly 600, according to certain aspects of the present disclosure. FIG. 6B is a top view of the first driving assembly 500 and the second driving assembly 600. As shown in FIG. 6A, the first magnetic component 520 and the second magnetic component 620 are each disposed in the corners of the base 120 that are not adjacent to each other. In this embodiment, the first magnetic component 520 and the second magnetic component 620 are disposed at diagonal corners of the base 120.

As shown in FIG. 6A, the first magnetically permeable component 511 includes a first segment 5111 and a second segment 5112. The second magnetically permeable component 611 includes a third segment 6111 and a fourth segment 6112.

When viewed along the direction of the optical axis (the Z-direction), the first segment 5111, the second segment 5112, the third segment 6111, and the fourth segment 6112 do not overlap. When viewed from the Z-direction (the direction of the optical axis), the first segment 5111 is perpendicular to the second segment 5112, the third segment 6111 is perpendicular to the fourth segment 6112. When viewed from the Z-direction (the direction of the optical axis), the first segment 5111 is parallel to the third segment 6111, and the second segment 5112 is parallel to the fourth segment 6112.

When viewed along the direction of the optical axis (the Z-direction), the first segment 5111, the second segment 5112, the third segment 6111, and the fourth segment 6112 surround the first opening 121, the second opening 122, and the third opening 123. The first coil 512 is disposed around the first segment 5111. The second coil 612 is disposed around the third segment 6111.

Please refer to FIG. 6B, in some embodiments, the first magnetic component 520 is disposed at the intersection between the first driving portion 510 and the second driving portion 610. The second magnetic component 620 is also disposed at the intersection between the first driving portion 510 and the second driving portion 610.

With this configuration, the first driving portion 510 corresponds to both the first magnetic component 520 and the second magnetic co lent 620, and the second driving portion 610 also corresponds to both the first magnetic component 520 and the second magnetic component 620. That is, when the first driving portion 510 is activated, both the first magnetic component 520 and the second magnetic component 620 may be driven. Similarly, when the second driving portion 610 is activated, both the first magnetic component 520 and the second magnetic component 620 may be driven.

In one embodiment of the present disclosure, the circuit assembly 700 (FIG. 1) provides the first driving portion 510 and the second driving portion 610 a current source, so that the first driving portion 510 and the second driving portion 610 are mutually electrically connected and jointly driven in series or parallel connection. That is to say, the first driving portion 510 and the second d g portion 610 will drive both the first magnetic component 520 and the second magnetic component 620 together, and there will be no situation that only one of the first driving portion 510 and the second driving portion 610 is powered on and activated individually.

Therefore, compared with the configuration in which one driving portion corresponds to one magnetic component, in the case in the present disclosure, where the first driving portion 510 and the second driving portion 610 are jointly driven by the circuit assembly 700 (FIG. 1), the driving force provided for the first magnetic component 520 and the second magnetic component 620 is increased. Thereby, the perform, of the optical component driving mechanism 10 is improved (for example, the first movable portion 300 and the second movable portion 400 (FIG. 4B to FIG. 4C) may be closed or opened at a faster speed), and the circuit control design is relatively simple.

In another embodiment of the present disclosure, the first driving portion 510 and the second driving portion 610 are driven individually. That is to say, the first driving portion 510 and the second driving portion 610 may be activated by the circuit assembly 700 (FIG. 1) which may provide different current sources, magnitudes and directions respectively. That is, the first driving portion 510 and the second driving portion 610 belong to different circuits loop without being electrically connected to each other.

For the purpose of illustrations, the process of moving the first movable portion 300 and the second movable portion 400 from the first position (FIG. 4B) to the second position (FIG. 4C) (or from the second position to the first position) is divided into two stages, which is a first stage and a second stage. In this embodiment, in the first stage, the first driving portion 510 and the second driving portion 610 can be activated by applying the same current at the same time, and the first magnetic component 520 and the second magnetic component 620 are driven with a stronger driving force. Thus, the first magnetic component 520 and the second magnetic component 620 rotate in the same clock direction. In the second stage, one of the first driving portion 510 or the second driving portion 610 is kept to be driven with the same current, and the other one of the first driving portion 510 or the second driving portion 610 is driven with a lower or reverse current. At this time, the driving force generated by the first magnetic component 520 and the second magnetic component 620 will decrease, so as to achieve the braking effect of deceleration.

With this configuration, the first movable portion 300 and the second movable portion 400 may start to be driven at a relatively fast speed in the first stage, and achieve a decelerating braking effect in the second stage, thereby improving the durability of the optical component driving mechanism 10.

The optical component driving mechanism disclosed in the present invention may determine whether the shutter (the first movable portion and the second movable portion) is in the open or closed state by using the sensing assembly, without turning on the image sensor. In addition, two driving portions of the present invention correspond to one magnetic component. Therefore, when the two driving assemblies are jointly driven by the circuit assembly, the driving assemblies may drive the movable portion with a larger driving force. When the two driving assemblies are individually driven by the circuit assembly, the speed or direction of rotation of the magnetic components may be controlled to produce the effect of acceleration or deceleration. Thereby reduce the force when the shutter is closing, and improving the durability of the optical component driving mechanism.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical component driving mechanism, comprising:
   a first movable portion;
   a fixed portion comprising a first opening, wherein the first movable portion is movable relative to the fixed portion;
   a first driving assembly configured to drive the first movable portion to move relative to the fixed portion;
   a second movable portion; and
   a second driving assembly,
   wherein the first opening corresponds to a first optical module, and the first movable portion and the first opening at least partially overlap when the first movable portion is in a first position,
   wherein the second driving assembly is configured to drive the second movable portion to move relative to the fixed portion, the first driving assembly comprises a first driving portion disposed in the fixed portion, and the second driving assembly comprises a second driving portion disposed in the fixed portion,
   wherein the first driving portion comprises a first segment and a second segment, and the second driving portion comprises a third segment and a fourth segment, wherein the first segment, the second segment, the third segment, and the fourth segment do not overlap when viewed along a direction of an optical axis,
   wherein the fixed portion further comprises a second opening and a third opening, wherein the first segment, the second segment, the third segment, and the fourth segment surround the first opening, the second opening, and the third opening when viewed along the direction of the optical axis, and
   wherein when the first movable portion is in the first position, the first movable portion overlaps a part of the first opening and the entirety of the second opening in the direction of the optical axis.

2. The optical component driving mechanism as claimed in claim 1, wherein the first driving portion and the second driving portion are jointly driven.

3. The optical component driving mechanism as claimed in claim 1, wherein the first driving portion and the second driving portion are individually driven.

4. The optical component driving mechanism as claimed in claim 1, wherein the first segment, the second segment, the third segment, and the fourth segment surround the first opening when viewed along the direction of the optical axis.

5. The optical component driving mechanism as claimed in claim 1, wherein when the second movable portion is in the first position, the second movable portion overlaps a part of the first opening and the entirety of the third opening in the direction of the optical axis.

6. The optical component driving mechanism as claimed in claim 1, further comprising a second driving assembly, wherein the first driving assembly comprises a first magnetic component, the second driving assembly comprises a second magnetic component, and the first magnetic component and the second magnetic component are disposed in the fixed portion.

7. The optical component driving mechanism as claimed in claim 6, wherein the first magnetic component and the second magnetic component are disposed in corners of the fixed portion that are not adjacent to each other.

8. The optical component driving mechanism as claimed in claim 1, further comprising a sensing assembly and a second movable portion, wherein the sensing assembly corresponds to the first movable portion and the second movable portion.

9. The optical component driving mechanism as claimed in claim 8, wherein the sensing assembly comprises a light-emitting component and a light-receiving component, wherein the light-emitting component is closer to a light incident end of an optical axis than the light-receiving component.

10. The optical component driving mechanism as claimed in claim 8, wherein when the first movable portion is in a second position and the second movable portion is in the first position, the sensing assembly determines the first movable portion and the second movable portion are in an open state.

11. The optical component driving mechanism as claimed in claim 1, wherein the fixed portion further comprises a stopper portion limiting the range of motion of the first movable portion.

12. The optical component driving mechanism as claimed in claim 1, further comprising a second movable portion, wherein the first movable portion and the second movable portion partially overlaps in a direction of an optical axis when the first movable portion and the second movable portion are in the first position.

13. The optical component driving mechanism as claimed in claim 12, further comprising a spacer plate disposed between the first movable portion and the second movable portion in the direction of the optical axis.

14. An optical component driving mechanism, comprising:
a first movable portion and a second movable portion;
a fixed portion comprising a first opening, wherein the first movable portion is movable relative to the fixed portion;
a first driving assembly configured to drive the first movable portion to move relative to the fixed portion; and
a sensing assembly, corresponding to the first movable portion and the second movable portion,
wherein the sensing assembly comprises a light-emitting component and a light-receiving component, wherein the light-emitting component is closer to a light incident end of an optical axis than the light-receiving component.

15. An optical component driving mechanism, comprising:
a first movable portion and a second movable portion;
a fixed portion comprising a first opening, wherein the first movable portion is movable relative to the fixed portion;
a first driving assembly configured to drive the first movable portion to move relative to the fixed portion; and
a sensing assembly, corresponding to the first movable portion and the second movable portion,
wherein when the first movable portion and the second movable portion are in a first position, the sensing assembly determines the first movable portion and the second movable portion are in a closed state.

16. An optical component driving mechanism, comprising:
a first movable portion and a second movable portion;
a fixed portion comprising a first opening, wherein the first movable portion is movable relative to the fixed portion;
a first driving assembly configured to drive the first movable portion to move relative to the fixed portion; and
a sensing assembly, corresponding to the first movable portion and the second movable portion,
wherein when the first movable portion is in a first position and the second movable portion is in a second position, the sensing assembly determines the first movable portion and the second movable portion are in an open state.

* * * * *